(12) United States Patent
Purane et al.

(10) Patent No.: US 12,427,968 B2
(45) Date of Patent: Sep. 30, 2025

(54) ELECTRIC PARKING BRAKE CONTROL DEVICE

(71) Applicant: HITACHI ASTEMO, LTD., Hitachinaka (JP)

(72) Inventors: Sandip Purane, Hitachinaka (JP); Kazuki Hiroyama, Hitachinaka (JP); Hiromasa Satoh, Hitachinaka (JP); Hiromu Narukawa, Hitachinaka (JP); Yasuhiro Yamamoto, Hitachinaka (JP); Masato Uno, Ueda (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 221 days.

(21) Appl. No.: 18/004,320

(22) PCT Filed: Jun. 29, 2021

(86) PCT No.: PCT/JP2021/024498
§ 371 (c)(1),
(2) Date: Jan. 5, 2023

(87) PCT Pub. No.: WO2022/009730
PCT Pub. Date: Jan. 13, 2022

(65) Prior Publication Data
US 2023/0249659 A1   Aug. 10, 2023

(30) Foreign Application Priority Data
Jul. 7, 2020   (JP) ................... 2020-117242

(51) Int. Cl.
*B60T 13/74* (2006.01)
*B60T 8/17* (2006.01)

(52) U.S. Cl.
CPC .............. *B60T 13/746* (2013.01); *B60T 8/17* (2013.01); *B60T 13/741* (2013.01); *B60Y 2400/81* (2013.01)

(58) Field of Classification Search
CPC ...... B60T 8/173; B60T 13/741; B60T 13/746; B60T 17/221; F16D 2121/24; B60W 10/182
See application file for complete search history.

(56) References Cited

U.S. PATENT DOCUMENTS

| 10,232,834 B2 | 3/2019 | Okada et al. |
| 2004/0026989 A1* | 2/2004 | Suzuki ................ B60T 13/741 303/20 |

(Continued)

FOREIGN PATENT DOCUMENTS

| JP | H01197160 A | 8/1989 |
| JP | H09240447 A | 9/1997 |

(Continued)

OTHER PUBLICATIONS

International Search Report issued for International Patent Application No. PCT/JP2021/024498, Date of mailing: Jul. 27, 2021, 5 pages including English translation.

(Continued)

*Primary Examiner* — David A Testardi
(74) *Attorney, Agent, or Firm* — HSML P.C.

(57) ABSTRACT

The present invention discloses an electric parking brake control device capable of accurately determining operation of an electric actuator. The electric parking brake control device is capable of performing an application process for controlling the electric actuator to move in the direction in which a friction member is pressed against a rotation body that rotates integrally with a wheel and a release process for controlling the electric actuator to move in the direction in which the friction member is moved away from the rotation (Continued)

body. Even upon receiving (time t12) a new operation request for operating the electric actuator during a period (time t1 to t5) from the start of the application process or the release process to the completion of the process, the electric parking brake control device does not change the operation of the electric actuator on the basis of the operation request.

12 Claims, 9 Drawing Sheets

(56) References Cited

U.S. PATENT DOCUMENTS

| | | | | |
|---|---|---|---|---|
| 2011/0308898 | A1* | 12/2011 | Shiraki | B60T 13/741 |
| | | | | 188/72.4 |
| 2012/0006634 | A1* | 1/2012 | Bensch | B60T 13/263 |
| | | | | 188/106 P |
| 2013/0275019 | A1* | 10/2013 | Murata | B60T 7/22 |
| | | | | 701/70 |
| 2014/0095042 | A1* | 4/2014 | Sakashita | B60T 13/662 |
| | | | | 701/70 |
| 2014/0172259 | A1* | 6/2014 | Blattert | B60T 7/122 |
| | | | | 701/70 |
| 2015/0274139 | A1* | 10/2015 | Okada | B60T 8/17 |
| | | | | 701/70 |
| 2016/0032995 | A1* | 2/2016 | Nishino | F16D 65/18 |
| | | | | 188/72.3 |
| 2016/0052496 | A1* | 2/2016 | Seto | F16D 55/225 |
| | | | | 188/72.1 |
| 2016/0311434 | A1* | 10/2016 | Ogata | B60T 7/107 |
| 2016/0311435 | A1* | 10/2016 | Ogata | F02N 11/0825 |
| 2016/0311436 | A1* | 10/2016 | Ogata | B60W 10/182 |
| 2017/0291585 | A1* | 10/2017 | Kobune | F16D 55/226 |
| 2017/0355356 | A1* | 12/2017 | Okada | B60T 7/06 |
| 2018/0072285 | A1* | 3/2018 | Tanaka | F16D 55/226 |
| 2018/0244255 | A1* | 8/2018 | Kawai | B60T 13/746 |

FOREIGN PATENT DOCUMENTS

| | | | | |
|---|---|---|---|---|
| JP | 2016124403 | A | * | 7/2016 |
| JP | 2016124408 | A | * | 7/2016 |
| JP | 6466473 | B2 | | 2/2019 |
| JP | 2020069948 | A | * | 5/2020 |
| WO | 2016104680 | A1 | | 6/2016 |
| WO | WO-2020137734 | A1 | * | 7/2020 ............ B60T 13/74 |

OTHER PUBLICATIONS

Written Opinion issued for International Patent Application No. PCT/JP2021/024498, Date of mailing: Jul. 27, 2021, 8 pages including English translation.

First Office Action issued for Indian Patent Application No. 202347006756, dated Feb. 15, 2023, 5 pages.

Extended European Search Report issued for European Patent Application No. 21837848.7, dated Nov. 7, 2023, 7 pages.

Notice of Reasons for Refusal issued for Japanese Patent Application No. 2022-535036, Dispatch Date: Dec. 12, 2023, 6 pages including English machine translation.

* cited by examiner

FIG.2
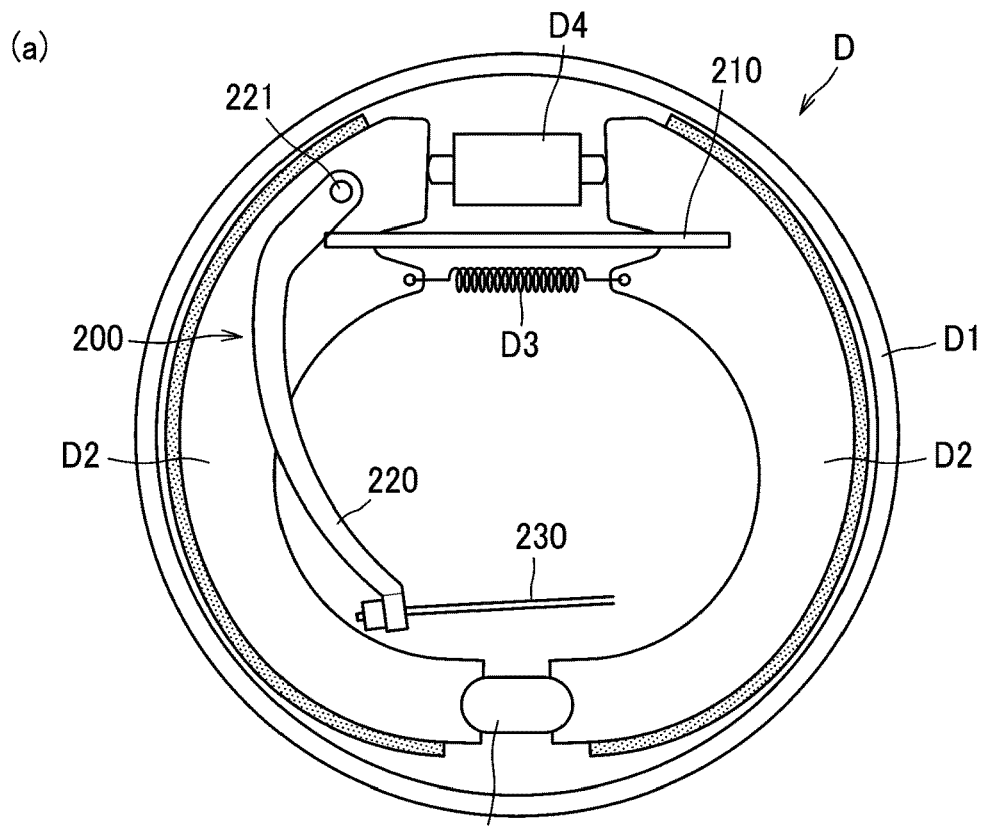
(a)
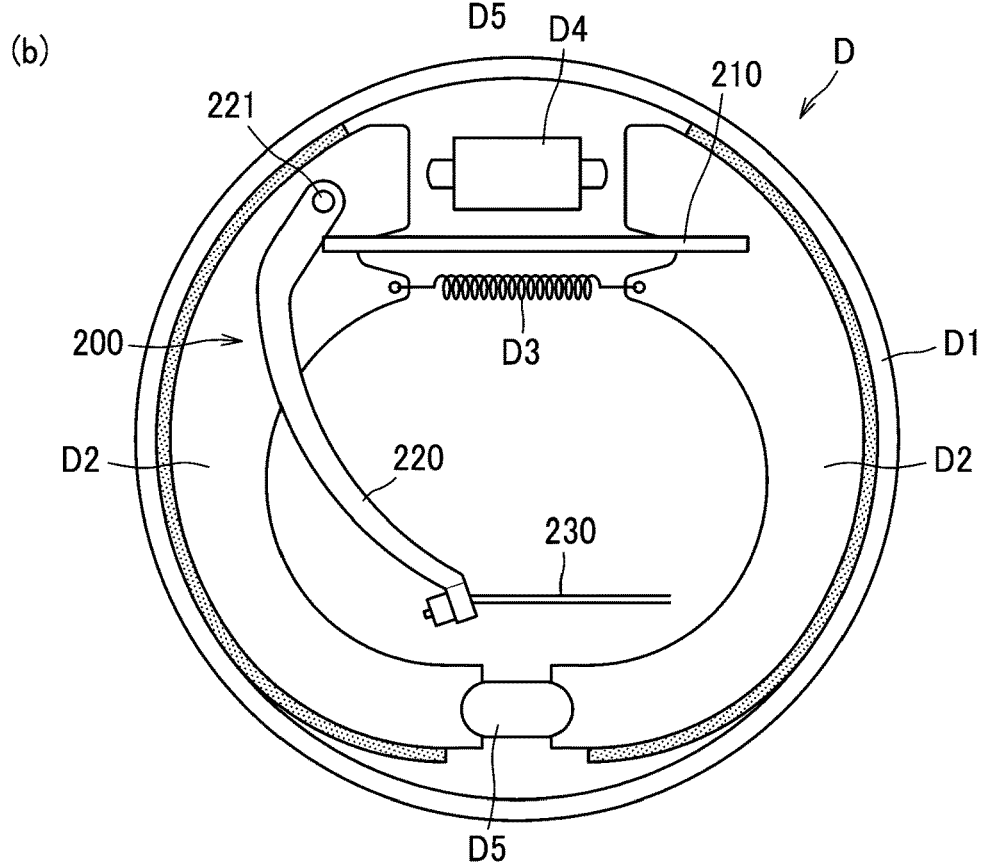
(b)

ELECTRIC PARKING BRAKE CONTROL DEVICE

TECHNICAL FIELD

The present disclosure relates to an electric parking brake control device that controls an electric actuator to move a friction member in a direction of being pressed against a rotation body that rotates integrally with a wheel and in a direction away from the rotation body.

BACKGROUND ART

In the related art, there is an electric parking brake control device capable of performing an application process for controlling an electric actuator to move a pad, which is a friction member, in a direction of being pressed against a rotor, which is a rotation body, and a release process for controlling the electric actuator to move the pad in a direction away from the rotor (see Japanese Patent No. 6466473). Specifically, in this technique, when the electric parking brake control device receives a request for the release process before the pad and the rotor come into contact with each other during the application process, the electric parking brake control device does not perform the release process until the pad and the rotor come into contact with each other, and performs the release process after the pad and the rotor come into contact with each other.

When receiving a request for the application process before the pad is away from the rotor during the release process, the electric parking brake control device does not perform the application process until the pad and the rotor are away from each other, and performs the application process after the pad and the rotor are away from each other.

SUMMARY OF INVENTION

In the related art, after the pad and the rotor come into contact with each other or are away from each other, the process is stopped in the middle before the application process or the release process is completed, and a different process is performed. Therefore, it may not be possible to accurately determine the operation of the electric actuator.

It is desired to provide an electric parking brake control device capable of accurately determining the operation of the electric actuator.

In view of the above background, disclosed is an electric parking brake control device capable of performing an application process for controlling an electric actuator to move a friction member in a direction of being pressed against a rotation body that rotates integrally with a wheel and a release process for controlling the electric actuator to move the friction member in a direction away from the rotation body.

Even when receiving a new operation request for operating the electric actuator during a period from the start of the application process or the release process to the completion of the process, the electric parking brake control device does not change the operation of the electric actuator based on the operation request.

According to this configuration, even when a new operation request is received during a period from the start of the application process or the release process to the completion of the process, the operation of the electric actuator is not changed based on the operation request. Therefore, the operation of the electric actuator can be accurately determined.

When receiving a new operation request for performing a process different from a current process during the period from the start of the application process or the release process to the completion of the process, the electric parking brake control device may perform a process based on the new operation request after the completion of the current process.

According to this configuration, when an operation request for performing a process different from the current process is issued during the application process or the release process, a process based on the new operation request is performed after the completion of the current process. Therefore, it is possible to quickly respond to a request of a user.

When receiving a new operation request for performing the same process as the current process during the period from the start of the application process or the release process to the completion of the process, the electric parking brake control device may not perform a process based on the new operation request after the completion of the current process.

According to this configuration, when an operation request for performing the same process as the current process is issued during the application process or the release process, a process based on the new operation request is not performed after the completion of the current process. Therefore, it is possible to prevent the same process from being repeatedly performed.

When receiving a plurality of new operation requests during the period from the start of the application process or the release process to the completion of the process, the electric parking brake control device may control the electric actuator based on a last received operation request among the plurality of new operation requests after the completion of the current process.

According to this configuration, since the electric actuator is controlled based on the last received operation request among the plurality of new operation requests received during the application process or the release process, the electric actuator can be controlled to correspond to the intention of the user.

BRIEF DESCRIPTION OF DRAWINGS

FIG. 2 shows views of a drum brake and a parking brake mechanism, in which (a) of FIG. 2 shows a state in which no brake is applied, and (b) of FIG. 2 shows a state in which a brake is applied by the parking brake mechanism.

DESCRIPTION OF EMBODIMENTS

An embodiment of an electric parking brake control device will be described in detail with reference to the drawings as appropriate.

Figure 1:
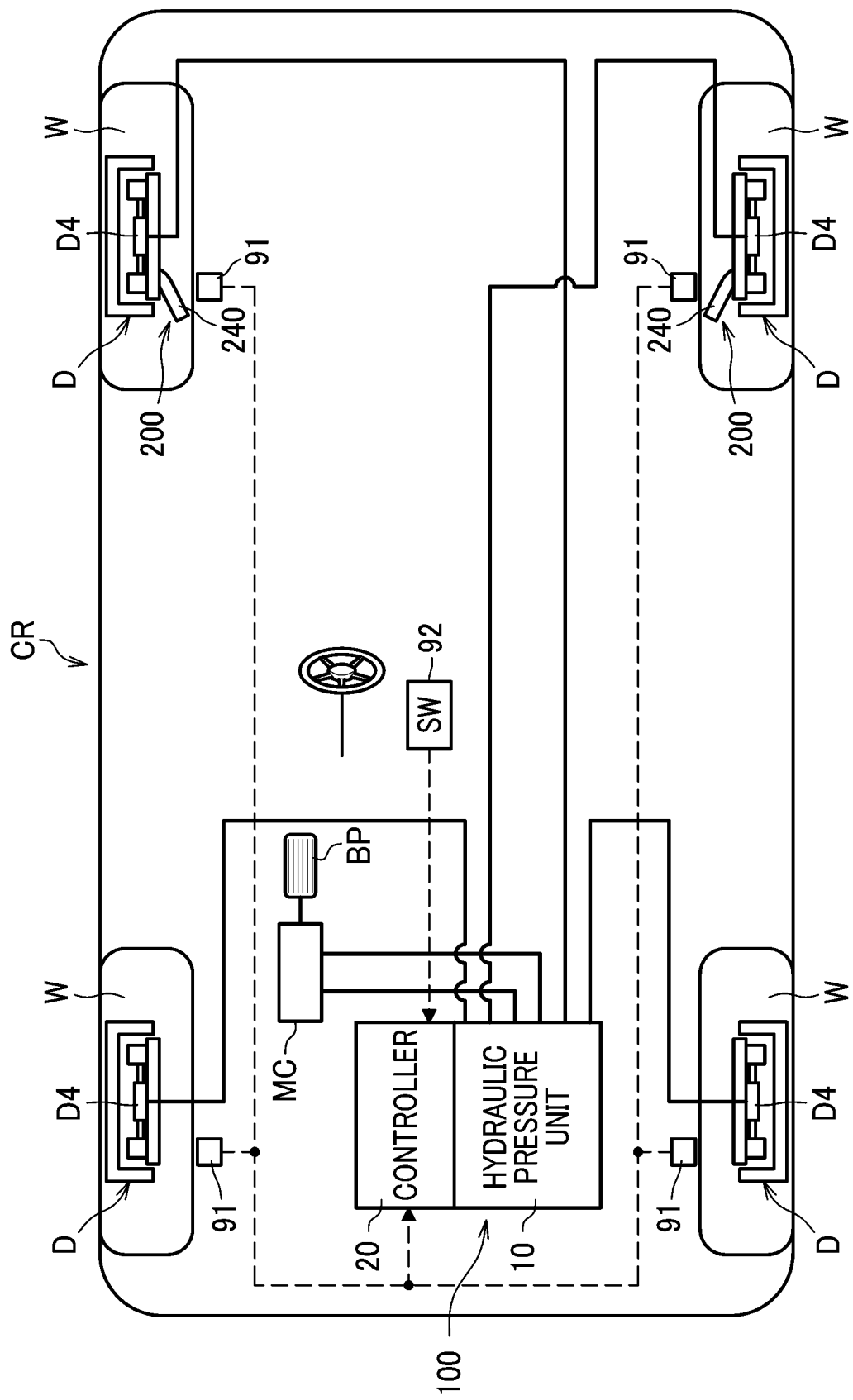
FIG. 1 is a configuration diagram of a vehicle including an electric parking brake control device according to an embodiment.

As shown in FIG. 1, a vehicle CR includes drum brakes D, parking brake mechanisms 200, and a vehicle brake hydraulic pressure control apparatus 100.

The drum brakes D are provided for four wheels W, respectively. The parking brake mechanisms 200 are mechanisms for mechanically operating the drum brakes D, and are provided for the drum brakes D provided on the two wheels W on a rear side.

The vehicle brake hydraulic pressure control apparatus 100 appropriately controls a braking force applied to each wheel W of the vehicle CR. The vehicle brake hydraulic pressure control apparatus 100 mainly includes a hydraulic pressure unit 10 in which fluid lines (hydraulic pressure lines) and various components are provided, and a controller 20 that appropriately controls various components in the hydraulic pressure unit 10. The hydraulic pressure unit 10 is connected, via fluid lines, to a master cylinder MC that generates a brake hydraulic pressure by depressing a brake pedal BP, and is connected to a wheel cylinder D4 of each drum brake D via fluid lines. The hydraulic pressure unit 10 includes a valve, a pump, and the like for controlling the brake hydraulic pressure applied to the wheel cylinders D4.

The controller 20 is an example of the electric parking brake control device. The controller 20 has a function of controlling driving and stopping of an electric actuator 240 that operates the parking brake mechanism 200, and also has a function of controlling the valve and the pump in the hydraulic pressure unit 10. Wheel speed sensors 91 and a parking switch 92 are connected to the controller 20. Each wheel speed sensor 91 detects a wheel speed of each wheel W. The parking switch 92 switches a state of the parking brake mechanism 200 between an application state and a release state. Here, the application state refers to a state in which the parking brake mechanism 200 generates a braking force. The release state refers to a state in which the parking brake mechanism 200 releases the braking force.

The parking switch 92 can be switched between an application position and a release position. The parking switch 92 outputs, to the controller 20, an application signal for switching the parking brake mechanism 200 into the application state when the parking switch 92 is located at the application position, and outputs, to the controller 20, a release signal for switching the parking brake mechanism 200 into the release state when the parking switch 92 is located at the release position.

The controller 20 includes, for example, a CPU, a RAM, a ROM, and an input/output circuit, and performs control by performing calculation processes based on an input from the wheel speed sensors 91, the parking switch 92, and the like, and a program and data stored in the ROM.

As shown in (a) and (b) of FIG. 2, the drum brake D includes a drum D1 as an example of a rotation body, brake shoes D2 as examples of a friction member, a return spring D3, and the wheel cylinder D4. The drum D1 is a member having a cylindrical portion that rotates integrally with the wheel W.

The brake shoe D2 is an arc-shaped member extending along an inner circumferential surface of the drum D1, and applies a braking force to the wheel W by being pressed against the inner circumferential surface of the drum D1. Two brake shoes D2 are provided along the inner circumferential surface of the drum D1. One end portion of each of the two brake shoes D2 is rotatably supported by a support member D5, so that the two brake shoes D2 are rotatable in a direction of approaching each other and in a direction of separating from each other.

The return spring D3 biases the other end portions of the two brake shoes D2 in a direction in which the other end portions of the two brake shoes D2 approach each other. The wheel cylinder D4 biases the two brake shoes D2 toward the inner circumferential surface of the drum D1 by the brake hydraulic pressure supplied from the hydraulic pressure unit 10.

Figure 3:
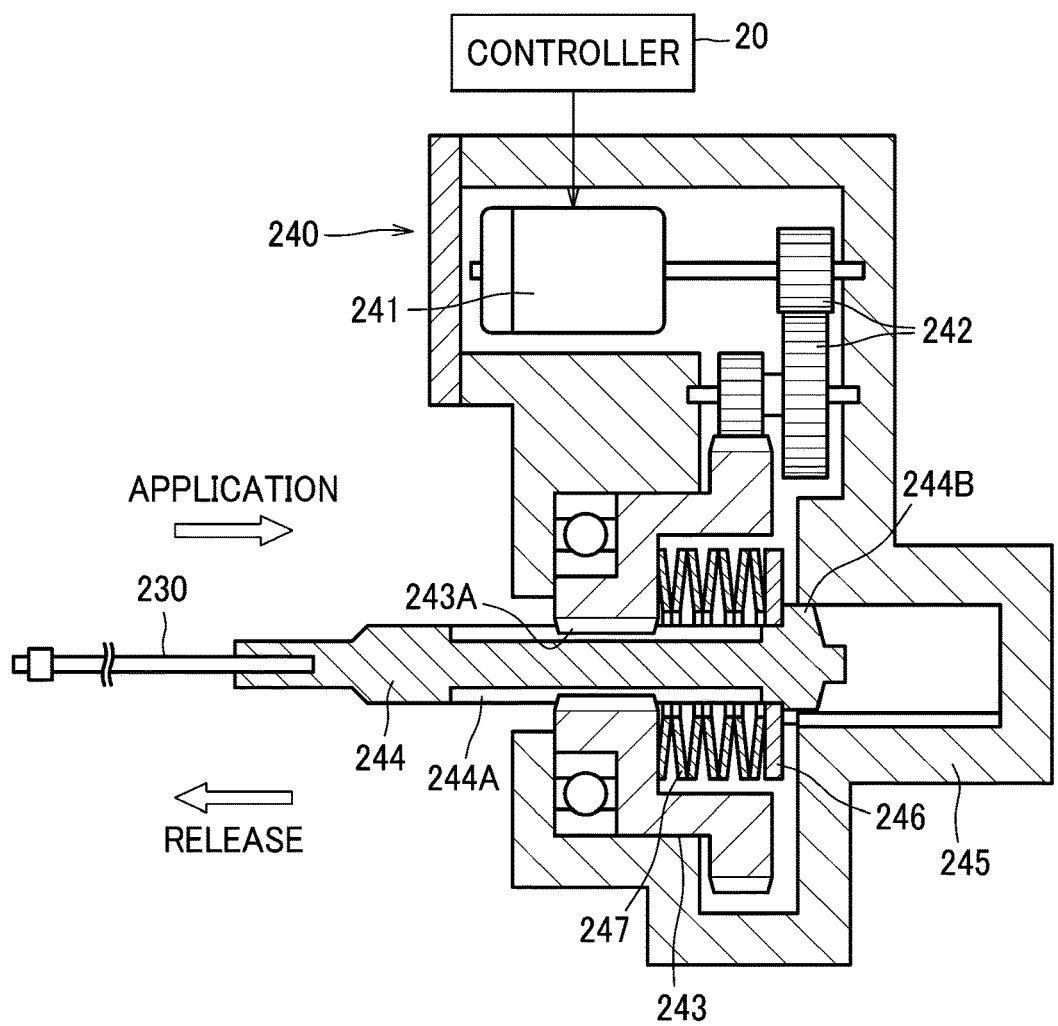
FIG. 3 is a cross-sectional view showing an electric actuator of the parking brake mechanism.

The parking brake mechanism 200 includes a strut 210, a parking lever 220, a wire 230, and the electric actuator 240 shown in FIG. 3. The strut 210 is engaged with the other end portions of the two brake shoes D2.

One end portion of the parking lever 220 is rotatably supported by one brake shoe D2 by a pin 221. The other end portion of the parking lever 220 is connected with the wire 230. A portion of the parking lever 220, which is between the one end portion and the other end portion and closer to the one end portion, is engaged with the strut 210.

When the wire 230 is pulled rightward in the drawing, the parking lever 220 rotates about the pin 221, whereby the parking lever 220 presses the other brake shoe D2 against the inner circumferential surface of the drum D1 via the strut 210. Further, when the wire 230 is pulled, the parking lever 220 rotates about an engagement portion with the strut 210, whereby the parking lever 220 presses the one brake shoe D2 against the inner circumferential surface of the drum D1 via the pin 221.

Accordingly, each brake shoe D2 is pressed against the inner circumferential surface of the drum D1 by a pulling operation of the wire 230. When the wire 230 is loosened leftward in the drawing, each brake shoe D2 is away from the inner circumferential surface of the drum D1 by a bias force of the return spring D3.

As shown in FIG. 3, the electric actuator 240 is a device for pulling the wire 230. The electric actuator 240 includes a motor 241, a plurality of gears 242, a nut 243, a screw shaft 244, a housing 245, a retainer 246, and a plurality of disc springs 247.

The nut 243 is connected to the motor 241 via the plurality of gears 242. The nut 243 has a female screw portion 243A that meshes with a male screw portion 244A of the screw shaft 244. The screw shaft 244 is supported by the housing 245 so as to be movable in an axial direction thereof, and the wire 230 is fixed to a distal end of the screw shaft 244. A flange 244B protruding in a radial direction is formed at an end portion of the screw shaft 244 on an opposite side to the distal end thereof.

The retainer 246 is a disc-shaped member having a hole at the center, and is engaged with the flange 244B of the screw shaft 244 from a distal end side of the screw shaft 244. The plurality of disc springs 247 are disposed between the flange 244B and the nut 243 in the axial direction of the screw shaft 244.

In the electric actuator 240, when the motor 241 rotates forward, the screw shaft 244 moves in a direction in which the screw shaft 244 is accommodated in the housing 245, so that the wire 230 is pulled, and the parking brake mechanism 200 enters the application state in which parking brake is effective. When the motor 241 rotates backward, the screw shaft 244 moves in a direction in which the screw shaft 244 protrudes from the housing 245, so that the wire 230 is loosened, and the parking brake mechanism 200 enters the release state in which the parking brake is released. In the release state, the plurality of disc springs 247 are sandwiched between the retainer 246 and the nut 243 in a deformed state.

In the following description, a position of the screw shaft 244 when the parking brake mechanism 200 is in the application state is also referred to as an "application position", and a position of the screw shaft 244 when the parking brake mechanism 200 is in the release state is also referred to as a "release position". Specifically, the release position is a position shown in FIG. 3, and the application position is a position at which the screw shaft 244 shown in FIG. 3 is moved to a right side in the drawing from the position in the drawing.

The controller 20 controls forward rotation, backward rotation, and stop of the motor 241 based on a signal from the parking switch 92. The controller 20 has a function of performing an application process and a release process. In the following description, the output of the application signal from the parking switch 92 is also referred to as a "request for the application process", the output of the release signal from the parking switch 92 is also referred to as a "request for the release process", and these requests for processes are also collectively referred to as an "operation request".

The application process is a process for driving the electric actuator 240 such that the parking brake mechanism 200 is in the application state. In other words, the application process is a process for controlling the electric actuator 240 to move the brake shoe D2 in a direction in which the brake shoe D2 is pressed against the drum D1. Specifically, when receiving a request for the application process, the controller 20 rotates the motor 241 forward to move the screw shaft 244 to the application position, thereby bringing the parking brake mechanism 200 into the application state.

Figure 7:
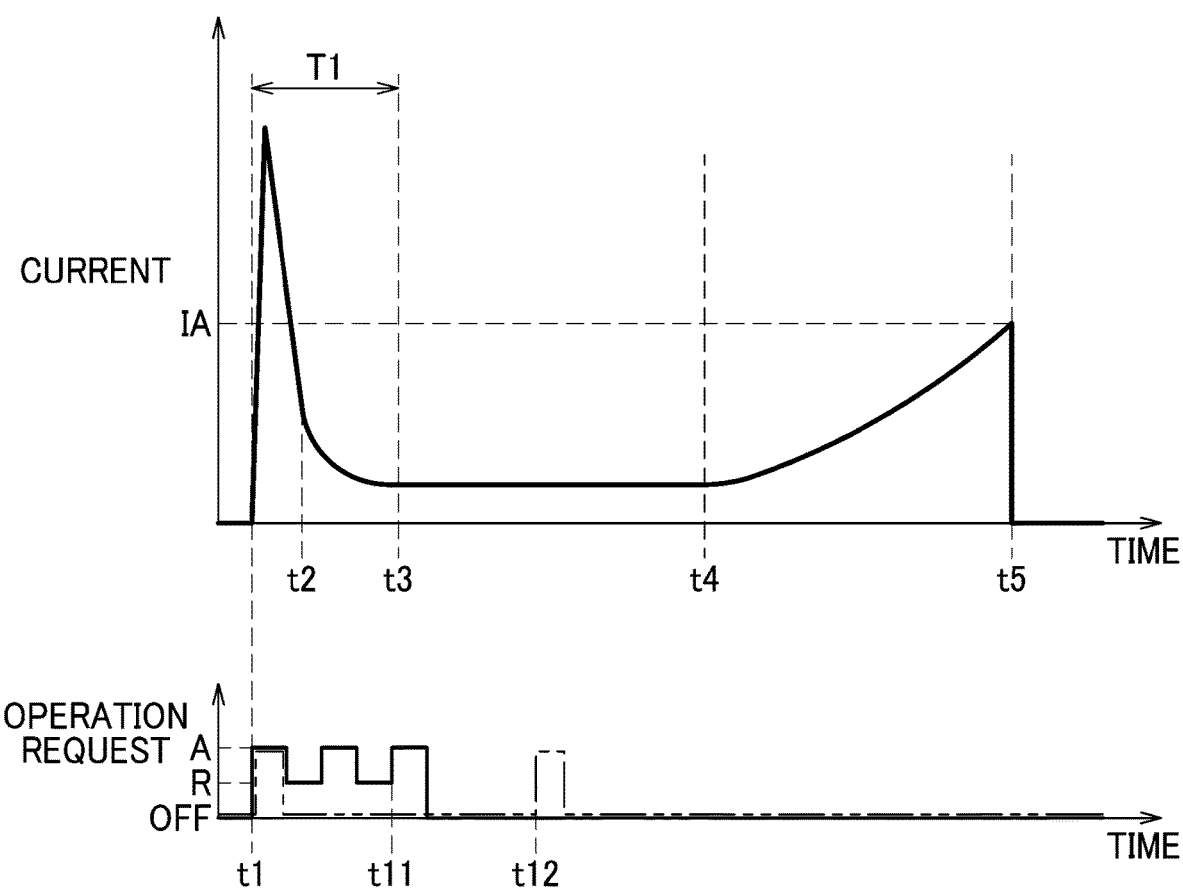
FIG. 7 is a time chart showing an example of operation of the controller when a new operation request received during an application process is a request for the application process.

Specifically, as shown in FIG. 7, when receiving a request for the application process (A), the controller 20 starts the application process by supplying a current for rotating the motor 241 forward to the motor 241 (time t1). At the start of energization of the motor 241, an inrush current is generated, but the inrush current converges after a predetermined time (time t2). When the inrush current converges, the motor 241 starts to rotate.

Accordingly, the screw shaft 244 starts to move from the release position toward the application position. As the screw shaft 244 moves from the release position toward the application position, a load applied to the screw shaft 244 from the disc spring 247 gradually decreases, and thus the current gradually decreases. When the screw shaft 244 is away from the retainer 246, no load is applied to the screw shaft 244 (time t3), and then the current is constant.

Thereafter, when the brake shoe D2 comes into contact with the drum D1 (time t4), the load applied to the screw shaft 244 gradually increases, and the current supplied to the motor 241 increases. Thereafter, when the current is equal to or larger than an application threshold IA (time t5), the controller 20 stops the energization and completes the application process.

The release process is a process for driving the electric actuator 240 such that the parking brake mechanism 200 is in the release state. In other words, the release process is a process for controlling the electric actuator 240 to move the brake shoe D2 in a direction away from the drum D1. Specifically, when receiving a request for the release process, the controller 20 rotates the motor 241 backward to move the screw shaft 244 to the release position, thereby bringing the parking brake mechanism 200 into the release state.

Figure 9:
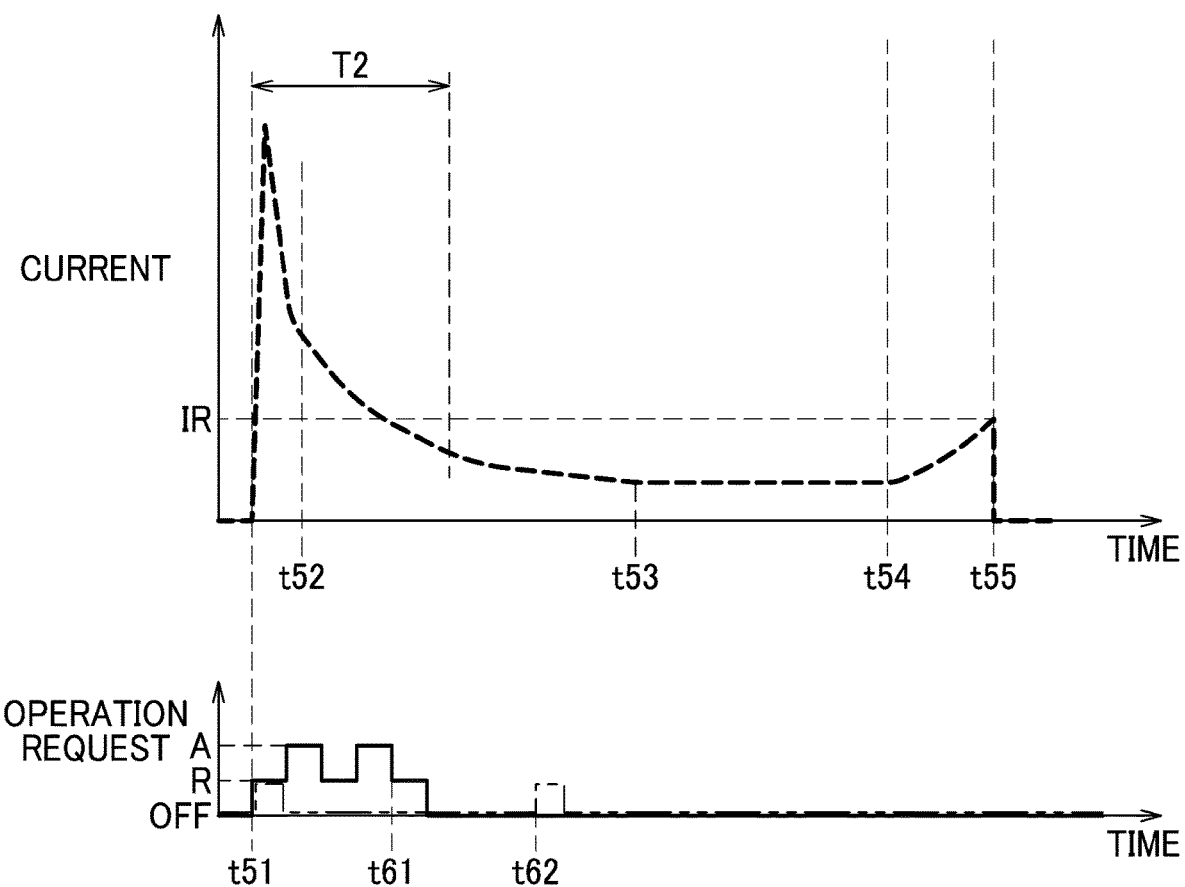
FIG. 9 is a time chart showing an example of the operation of the controller when a new operation request received during the release process is a request for the release process.

Specifically, as shown in FIG. 9, when receiving a request for the release process (R), the controller 20 starts the release process by supplying a current for rotating the motor 241 backward to the motor 241 (time t51). At the start of energization of the motor 241, an inrush current is generated, but the inrush current converges after a predetermined time (time t52). When the inrush current converges, the motor 241 starts to rotate.

Accordingly, the screw shaft 244 moves from the application position toward the release position, and the brake shoe D2 moves in the direction away from the drum D1. As the screw shaft 244 moves from the application position toward the release position, a load applied to the screw shaft 244 from the brake shoe D2 gradually decreases, and thus the current gradually decreases. When the brake shoe D2 is away from the drum D1, no load is applied to the screw shaft 244 (time t53), and then the current is constant.

Thereafter, when the screw shaft 244 comes into contact with the retainer 246 (time t54), a load applied to the screw shaft 244 from the disc spring 247 gradually increases, and the current supplied to the motor 241 increases. Thereafter, when the current is equal to or larger than a release threshold IR (time t55), the controller 20 stops the energization and completes the release process.

Even when receiving a new operation request for operating the electric actuator 240 during a period from the start of the application process or the release process to the completion of the process, the controller 20 is configured not to change the operation of the electric actuator 240 based on the operation request. When receiving a new operation request for performing a process different from the current process during the period from the start of the application process or the release process to the completion of the process, the controller 20 is configured to perform a process based on the new operation request after the completion of the current process (see FIGS. 8 and 10).

Further, when receiving a new operation request for performing the same process as the current process during the period from the start of the application process or the release process to the completion of the process, the controller 20 is configured not to perform a process based on the new operation request after the completion of the current process (See FIGS. 7 and 9). When receiving a plurality of new operation requests during the period from the start of the application process or the release process to the completion of the process, the controller 20 is configured to control the electric actuator 240 based on a last received operation request among the plurality of new operation requests after the completion of the current process.

Next, processes of the controller 20 will be described in detail with reference to FIGS. 4 to 6. The controller 20 repeatedly executes the process shown in FIG. 4 at all times.

Figure 4:
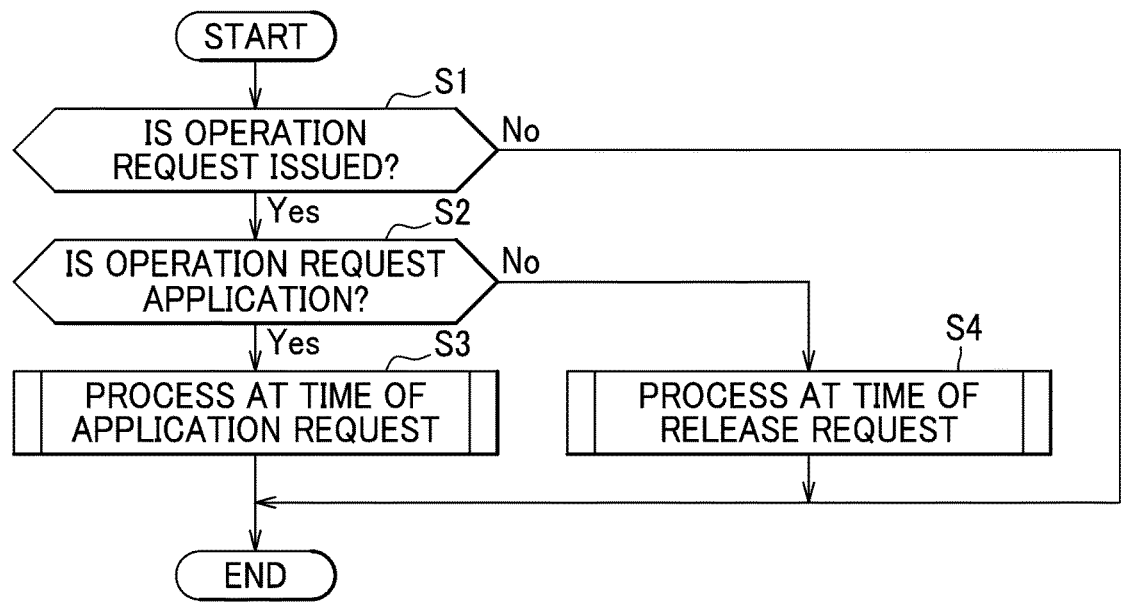
FIG. 4 is a flowchart showing a process performed by a controller.

In the process shown in FIG. 4, the controller 20 first determines whether an operation request for operating the electric actuator 240 is issued (S1). When it is determined in step S1 that the operation request is not issued (No), the controller 20 ends the present process.

When it is determined in step S1 that the operation request is issued (Yes), the controller 20 determines whether the operation request is a request for the application process (S2). When it is determined in step S2 that the operation request is a request for the application process (Yes), the controller 20 performs a process at the time of an application request (S3). Here, the process at the time of an application request is a process shown in FIG. 5 performed when the request for the application process is received, and will be described in detail later.

When it is determined in step S2 that the operation request is not a request for the application process (Yes), the controller 20 performs a process at the time of a release request (S4). Here, the process at the time of a release request is a process shown in FIG. 6 performed when a request for the release process is received, and will be described in detail later. After step S3 or step S4, the controller 20 ends the present process.

Figure 5:
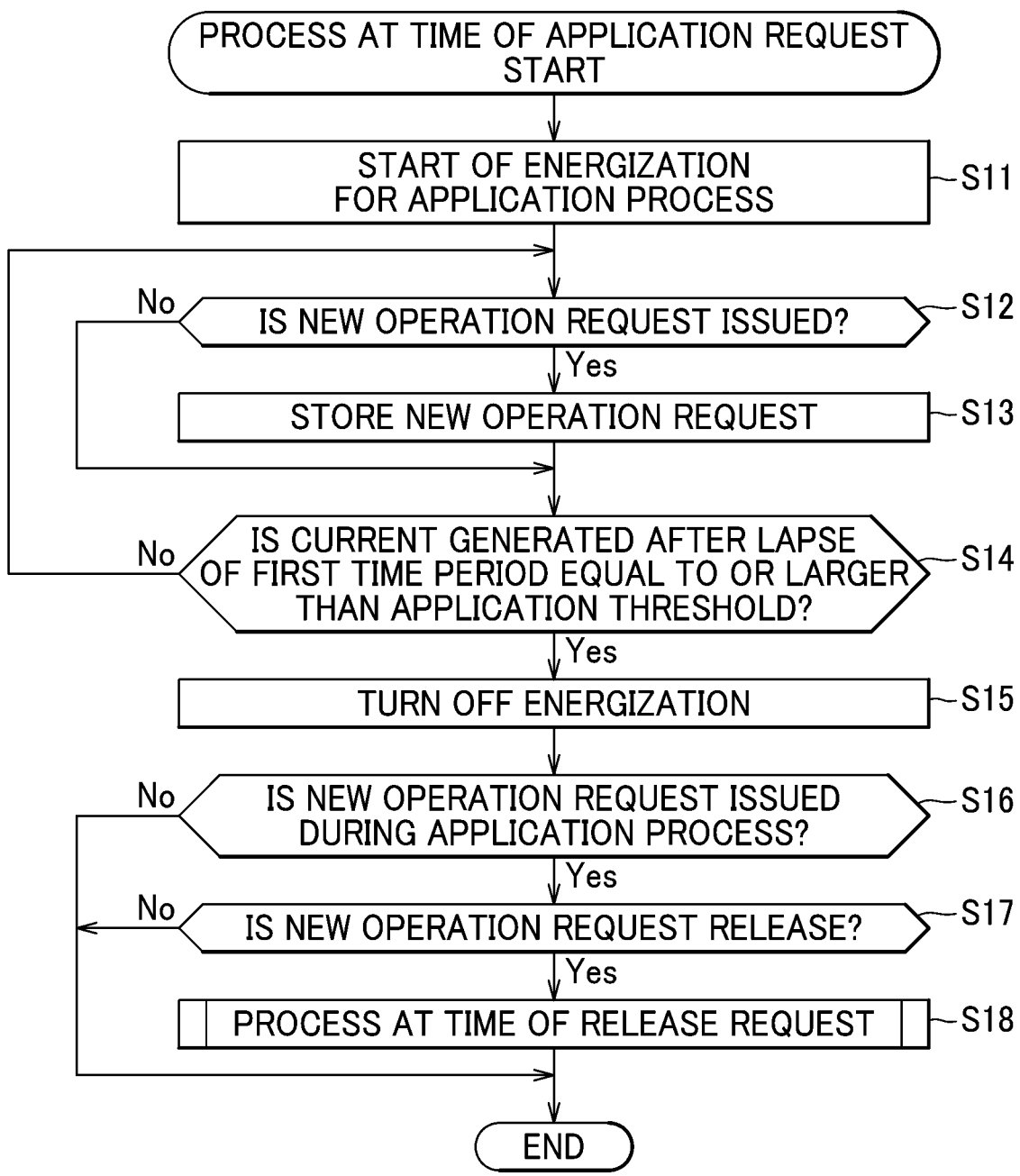
FIG. 5 is a flowchart showing a process at the time of an application request.

As shown in FIG. 5, in the process at the time of an application request, the controller 20 performs an application process shown in steps S11 to S15, and then performs a process shown in steps S16 to S18 for controlling the electric actuator 240 based on a new operation request received during the application process. Specifically, in the process at the time of an application request, the controller 20 first starts energization for the application process (S11). Specifically, in step S11, the controller 20 supplies a current for rotating the motor 241 forward to the motor 241.

After step S11, the controller 20 determines whether a new operation request is present (S12). When it is determined in step S12 that a new operation request is present (Yes), the controller 20 stores the new operation request (S13).

After step S13 or when it is determined in step S12 that no new operation request is present (No), the controller 20 determines whether a current generated after the lapse of a first time period T1 (see FIG. 7) from the start of the application process is equal to or larger than the application threshold IA (S14). Specifically, in step S14, the controller 20 determines whether both a condition that the first time period T1 has elapsed from the start of the application process and a condition that the current is equal to or larger than the application threshold IA are satisfied. Here, the first time period T1 is a time period from the start of the application process until the current becomes sufficiently smaller than the application threshold IA after the inrush current generated at the start is converged, and is appropriately set by an experiment, a simulation, or the like.

When it is determined in step S14 that the current generated after the lapse of the first time period T1 is not equal to or larger than the application threshold IA (No), the controller 20 returns to the process in step S12. When it is determined in step S14 that the current generated after the lapse of the first time period T1 is equal to or larger than the application threshold IA (Yes), the controller 20 turns off the energization and completes the application process (S15).

After step S15, the controller 20 determines whether a new operation request is present during the application process completed this time (S16). When it is determined in step S16 that the new operation request is present (Yes), the controller 20 determines whether the new operation request is a request for the release process (S17). Specifically, when one new operation request is received during the application process, the controller 20 determines whether the operation request is the request for the release process (S17).

When it is determined in step S17 that the new operation request is the request for the release process (Yes), the controller 20 performs a process at the time of a release request (S18) and ends the present process. When it is determined as No in step S16 or step S17, the controller 20 ends the present process as it is. Therefore, when the new operation request is a request for the application process in step S17, the controller 20 ends the present process without performing the application process.

When receiving a plurality of operation requests during the application process, the controller 20 determines whether the last received operation request among the plurality of new operation requests is a request for the release process (S17).

Any method may be used to specify the last received operation request from the plurality of new operation requests. For example, in step S13, the plurality of new operation requests and times at which the operation requests are received may be stored in association, and the last received operation request may be specified based on the times. In step S13, the last received operation request may be specified by overwriting the new operation request stored last time with the new operation request. The stored new operation request may be reset, for example, at the start of the application process or at the start of the release process.

Figure 6:
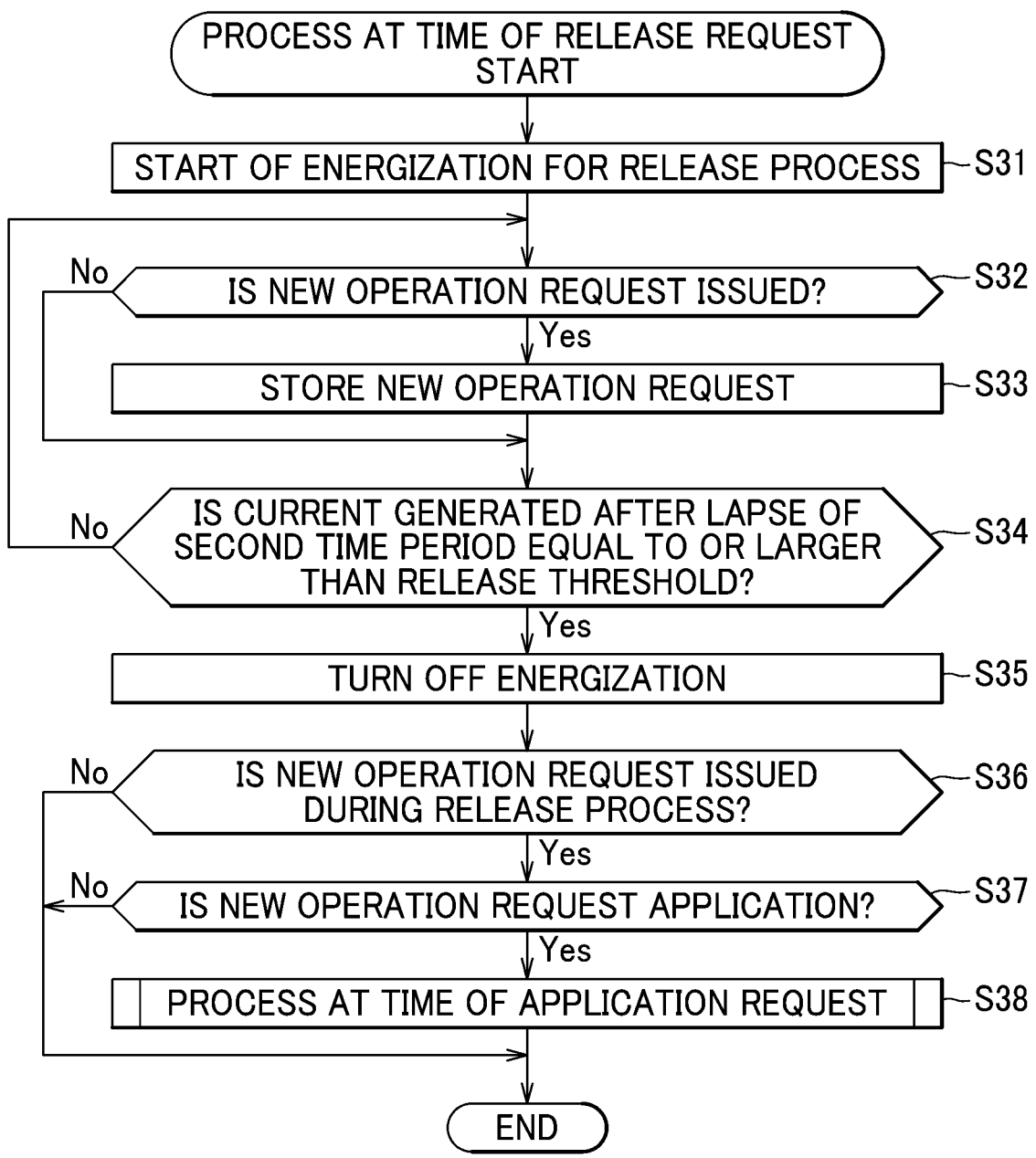
FIG. 6 is a flowchart showing a process at the time of a release request.

As shown in FIG. 6, in the process at the time of a release request, the controller 20 performs a release process shown insteps S31 to S35, and then performs a process shown in steps S36 to S38 for controlling the electric actuator 240 based on a new operation request received during the release process. Specifically, in the process at the time of a release request, the controller 20 first starts energization for the release process (S31). Specifically, in step S31, the controller 20 supplies a current for rotating the motor 241 backward to the motor 241.

After step S31, the controller 20 determines whether a new operation request is present (S32). When it is determined in step S32 that the new operation request is present (Yes), the controller 20 stores the new operation request (S33).

After step S33 or when it is determined in step S32 that no new operation request is present (No), the controller 20 determines whether a current generated after the lapse of a second time period T2 (see FIG. 9) from the start of the release process is equal to or larger than the release threshold IR (S34). Specifically, in step S34, the controller 20 determines whether both a condition that the second time period T2 has elapsed from the start of the release process and a condition that the current is equal to or larger than the release threshold IR are satisfied. Here, the second time period T2 is a time period from the start of the release process until the current becomes sufficiently smaller than the release threshold IR after the inrush current generated at the start is converged, and is appropriately set by an experiment, a simulation, or the like.

When it is determined in step S34 that the current generated after the lapse of the second time period T2 is not equal to or larger than the release threshold IR (No), the controller 20 returns to the process in step S32. When it is determined in step S34 that the current generated after the lapse of the second time period T2 is equal to or larger than the release threshold IR (Yes), the controller 20 turns off the energization and completes the release process (S35).

After step S35, the controller 20 determines whether a new operation request is issued during the release process completed this time (S36). When it is determined in step S36 that the new operation request is issued (Yes), the controller 20 determines whether the new operation request is a request for the application process (S37). Specifically, when one new operation request is received during the release process, the controller 20 determines whether the operation request is the request for the application process (S37).

When it is determined in step S37 that the new operation request is a request for the application process (Yes), the controller 20 performs a process at the time of an application request (S38) and ends the present process. When it is determined as No in step S36 or step S37, the controller 20 ends the present process as it is. Therefore, when the new operation request is a request for the release process in step S37, the controller 20 ends the present process without performing the release process.

When receiving a plurality of operation requests during the release process, the controller 20 determines whether the last received operation request among the plurality of new operation requests is a request for the application process (S37).

A method for specifying the last received operation request from a plurality of new operation requests and a method for resetting a new operation request may be performed in the same manner as the process at the time of an application request.

Next, an example of the operation of the controller 20 will be described in detail with reference to FIGS. 7 to 10.

As shown in FIG. 7, when receiving a request for the application process (A), the controller 20 starts an application process (time t1). During the application process (t1 to t5), as shown by solid lines in the drawing, when a plurality of new operation requests are received and the last received operation request is the request for the application process (A) (time t11), the controller 20 does not perform an application process based on a new request for the application process (A) after the completion of the application process (time t5). During the application process (t1 to t5), as shown by two-dot chain lines in the drawing, even when only one request of the application process (A) is received as a new operation request (time t12), the controller 20 does not perform an application process based on the new request for the application process (A) after the completion of the application process (time t5).

Figure 8:
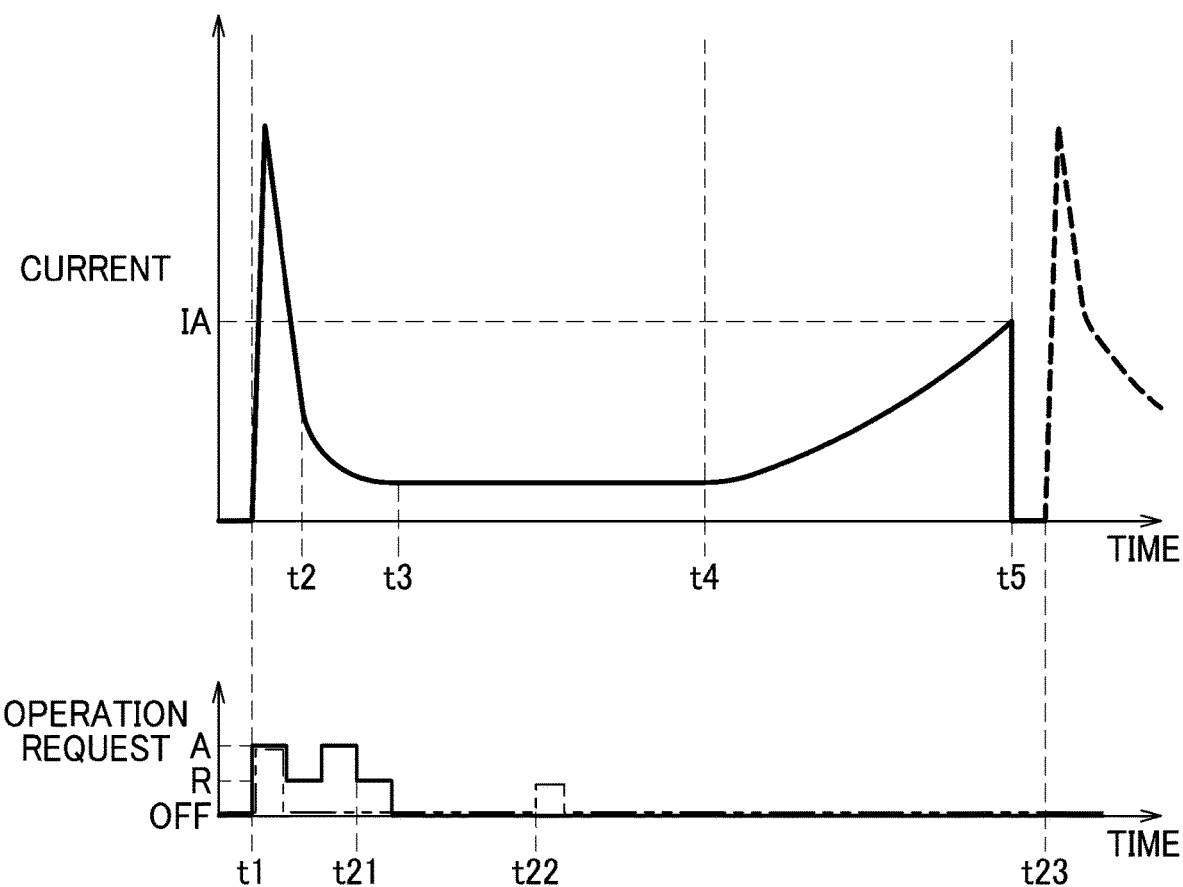
FIG. 8 is a time chart showing an example of operation of the controller when a new operation request received during the application process is a request for a release process.

As shown in FIG. 8, during the application process (t1 to t5), as shown by solid lines in the drawing, when a plurality of new operation requests are received and the last received operation request is the request for the release process (R) (time t21), the controller 20 performs a release process (time t23) after the completion of the application process (time t5). During the application process (t1 to t5), as shown by two-dot chain lines in the drawing, even when only one request for the release process (R) is received as a new operation request (time t22), the controller 20 performs a release process (time t23) after the completion of the application process (time t5).

As shown in FIG. 9, when receiving the request for the release process (R), the controller 20 starts a release process (time t51). During the release process (t51 to t55), as shown by solid lines in the drawing, when a plurality of new operation requests are received and the last received operation request is the request for the release process (R) (time t61), the controller 20 does not perform a release process based on a new request for the release process (R) after the completion of the release process (time t5). During the release process (t51 to t55), as shown by two-dot chain lines in the drawing, even when only one request for the release process (R) is received as a new operation request (time t62), the controller 20 does not perform a release process based on the new request for the release process (R) after the completion of the release process (time t55).

Figure 10:
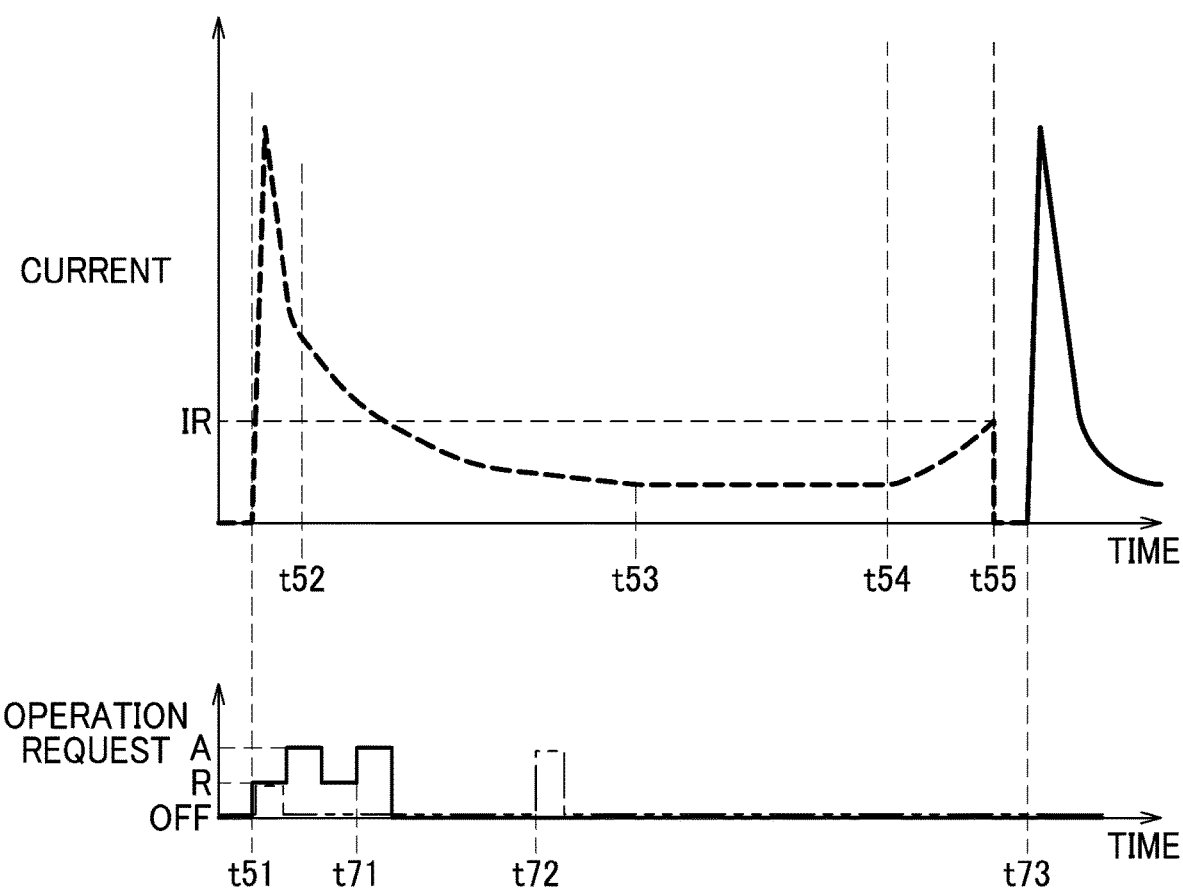
FIG. 10 is a time chart showing an example of the operation of the controller when a new operation request received during the release process is a request for the application process.

As shown in FIG. 10, during the release process (t51 to t55), as shown by solid lines in the drawing, when a plurality of new operation requests are received and the last received operation request is the request for the application process (A) (time t71), the controller 20 performs an application process (time t73) after the completion of the release process (time t55). During the release process (t51 to t55), as shown by two-dot chain lines in the drawing, even when only one request for the application process (A) is received as a new operation request (time t72), the controller 20 performs an application process (time t73) after the completion of the release process (time t55).

According to the above, the following effects can be obtained in the present embodiment.

Even when a new operation request is received during a period from the start of the application process or the release process to the completion of the process, the operation of the electric actuator 240 is not changed based on the operation request. Therefore, the operation of the electric actuator 240 can be accurately determined.

When an operation request for performing a process different from a current process is issued during the application process or the release process, a process based on the new operation request is performed after the completion of the current process. Therefore, it is possible to quickly respond to a request of a user.

According to this configuration, when an operation request for performing the same process as the current process is issued during the application process or the release process, a process based on the new operation request is not performed after the completion of the current process. Therefore, it is possible to prevent the same process from being repeatedly performed.

Since the electric actuator 240 is controlled based on the last received operation request among the plurality of new operation requests received during the application process or the release process, the electric actuator 240 can be controlled to correspond to the intention of the user.

The above-described embodiment may be modified into various forms as exemplified below.

In the above embodiment, the controller 20 of the vehicle brake hydraulic pressure control apparatus 100 is given as an example of the electric parking brake control device, but a control device other than the vehicle brake hydraulic pressure control apparatus, for example, an electronic control unit (ECU) of a vehicle may be used as the electric parking brake control device.

In the above-described embodiment, the parking brake mechanism 200 installed in the drum brake D is given as an example, but a parking brake mechanism installed in a disc brake may be used, for example. In this case, a rotor that rotates integrally with the wheel corresponds to the rotation body, and a pad that is pressed against the rotor corresponds to the friction member.

The elements described in the above-described embodiment and the modification may be combined as desired.

The invention claimed is:

1. An electric parking brake control device for performing, in response to operation requests, an application process for controlling an electric actuator to move a friction member in a direction of being pressed against a rotation body that rotates integrally with a wheel, and a release process for controlling the electric actuator to move the friction member in a direction away from the rotation body, wherein when a new operation request is received during a period from a start of the application process or the release process to completion of the application process or the release process, respectively, control of operation of the electric actuator is not changed based on the new operation request, the electric parking brake control device is configured to:
- start an application process in response to an operation request when the operation request is an operation request for the application process;
- stop energization of the electric actuator to complete the application process when a current generated after an inrush current converges as determined by a predetermined time passing after energization of a motor of the electric actuator becomes equal to or greater than an application threshold when no new operation requests are received by the electric parking brake control device during the application process; and
- perform the application process until the current generated after the inrush current converges becomes equal to or greater than the application threshold when the electric parking brake control device receives a new operation request during the application process, and then stop energization of the electric actuator to complete the application process.

2. The electric parking brake control device according to claim 1, wherein when the new operation request received during the application process is an operation request for the release process, the release process based on the new operation request received during the application process is performed after completion of the application process.

3. The electric parking brake control device according to claim 2, wherein when a plurality of new operation requests is received during the application process, the electric actuator is controlled based on a last received operation request among the plurality of new operation requests after the completion of the application process.

4. The electric parking brake control device according to claim 2, wherein when the new operation request received during the application process is an operation request for the application process, the application process based on the new operation request received during the application process is not performed after the application process.

5. The electric parking brake control device according to claim 1, wherein when the new operation request received during the application process is an operation request for the application process, the application process based on the new operation request received during the application process is not performed after the application process.

6. The electric parking brake control device according to claim 5, wherein when a plurality of new operation requests is received during the application process, the electric actuator is controlled based on a last received operation request among the plurality of new operation requests after the completion of the application process.

7. An electric parking brake control device for performing, in response to operation requests, an application process for controlling an electric actuator to move a friction member in a direction of being pressed against a rotation body that rotates integrally with a wheel, and a release process for controlling the electric actuator to move the friction member in a direction away from the rotation body, wherein when new operation request is received during a period from a start of the application process or the release process to completion of the application process or the release process, respectively, control of operation of the electric actuator is not changed based on the new operation request, the electric parking brake control device is configured to:
- start a release process in response to an operation request when the operation request is an operation request for the release process;
- stop energization of the electric actuator to complete the release process when a current generated after an inrush current converges as determined by a predetermined amount of time passing after energization of a motor of the electric actuator becomes equal to or greater than a release threshold when no new operation requests are received during the release process; and
- perform the release process until a current generated after an inrush current converges becomes equal to or greater than the release threshold, even when the electric parking brake control device receives a new operation request during the release process, and then stop energization of the electric actuator to complete the release process.

8. The electric parking brake control device according to claim 7, wherein when the new operation request received during the release process is an operation request for the application process, the application process based on the new operation request received during the release process is performed after completion of the release process.

9. The electric parking brake control device according to claim 8, wherein when a plurality of new operation requests is received during the release process, the electric actuator is controlled based on a last received operation request among the plurality of new operation requests after the completion of the release process.

10. The electric parking brake control device according to claim 8, wherein when the new operation request received during the release process is an operation request for the release process, the release process based on the new operation request received during the release process is not performed after the release process.

11. The electric parking brake control device according to claim 7, wherein when the new operation request received during the release process is an operation request for the release process, the release process based on the new operation request received during the release process is not performed after the release process.

12. The electric parking brake control device according to claim 11, wherein when a plurality of new operation requests is received during the release process, the electric actuator is controlled based on a last received operation request among the plurality of new operation requests after completion of the release process.

* * * * *